M. O. REHFUSS.
MACHINE FOR MAKING LINKS FOR CHAINS.
APPLICATION FILED MAR. 14, 1919.
1,360,020.
Patented Nov. 23, 1920.
5 SHEETS—SHEET 1.
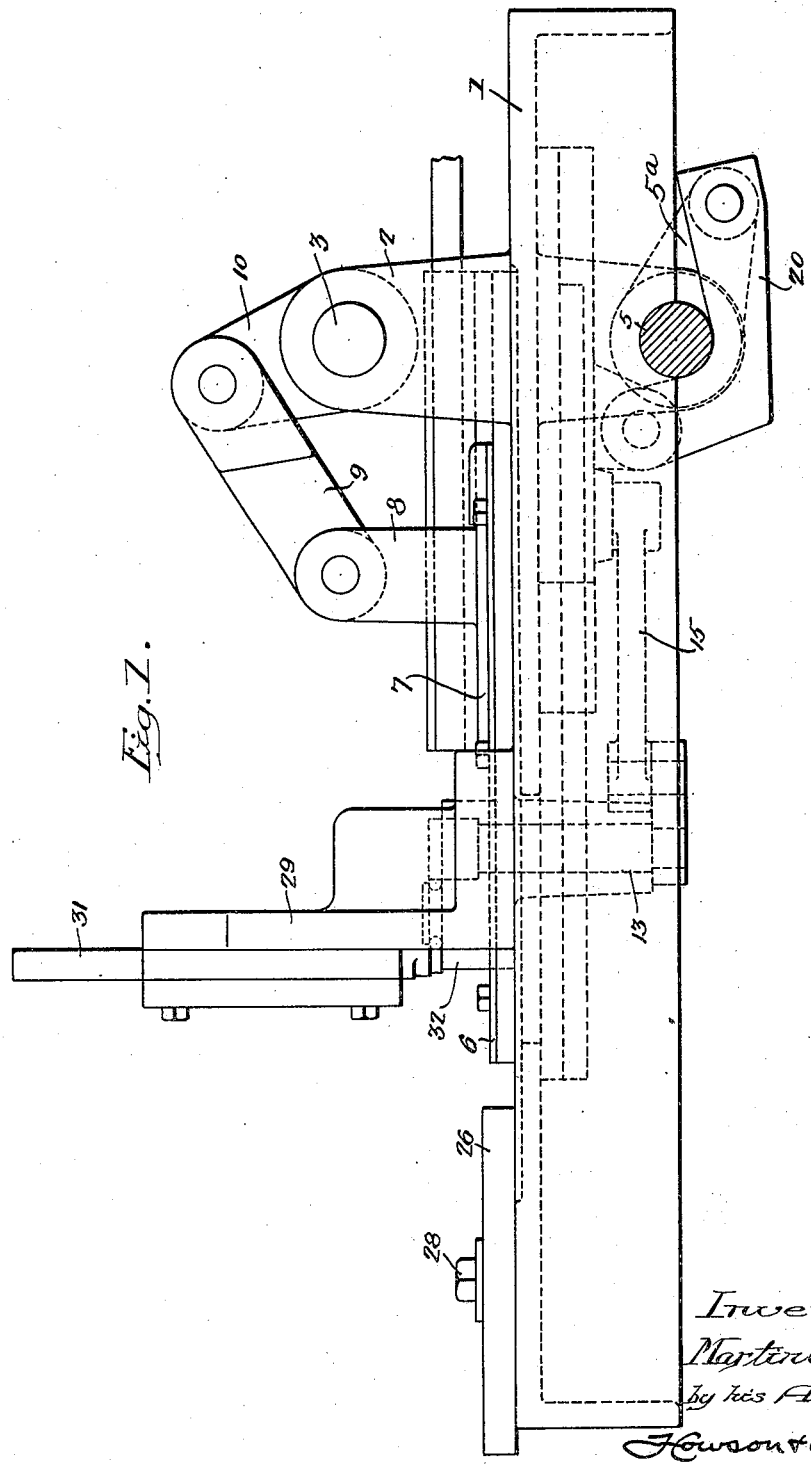

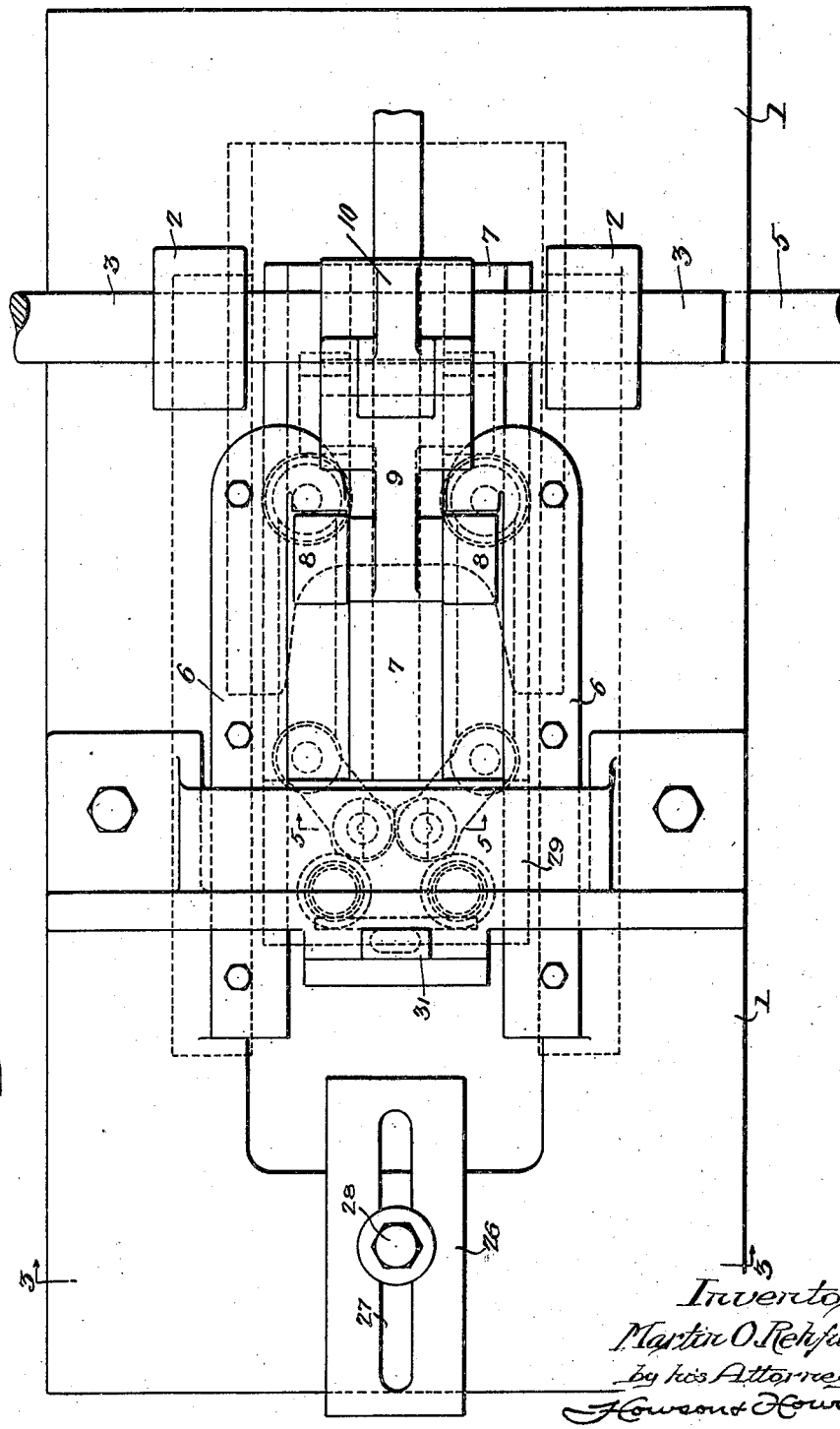

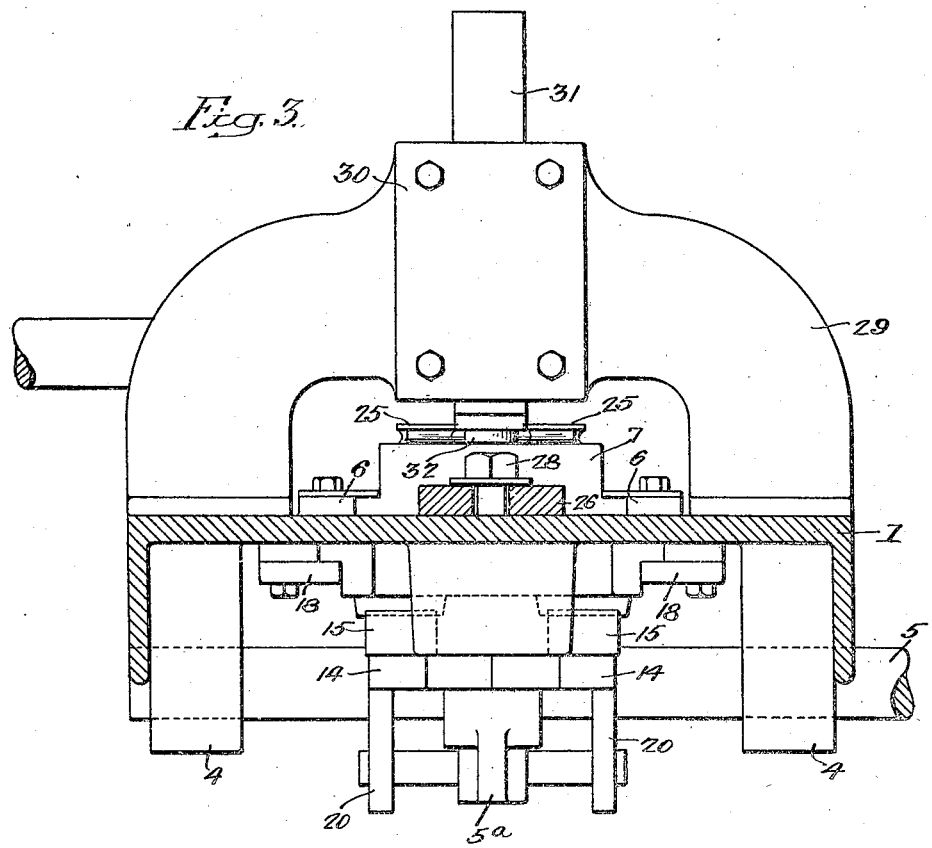

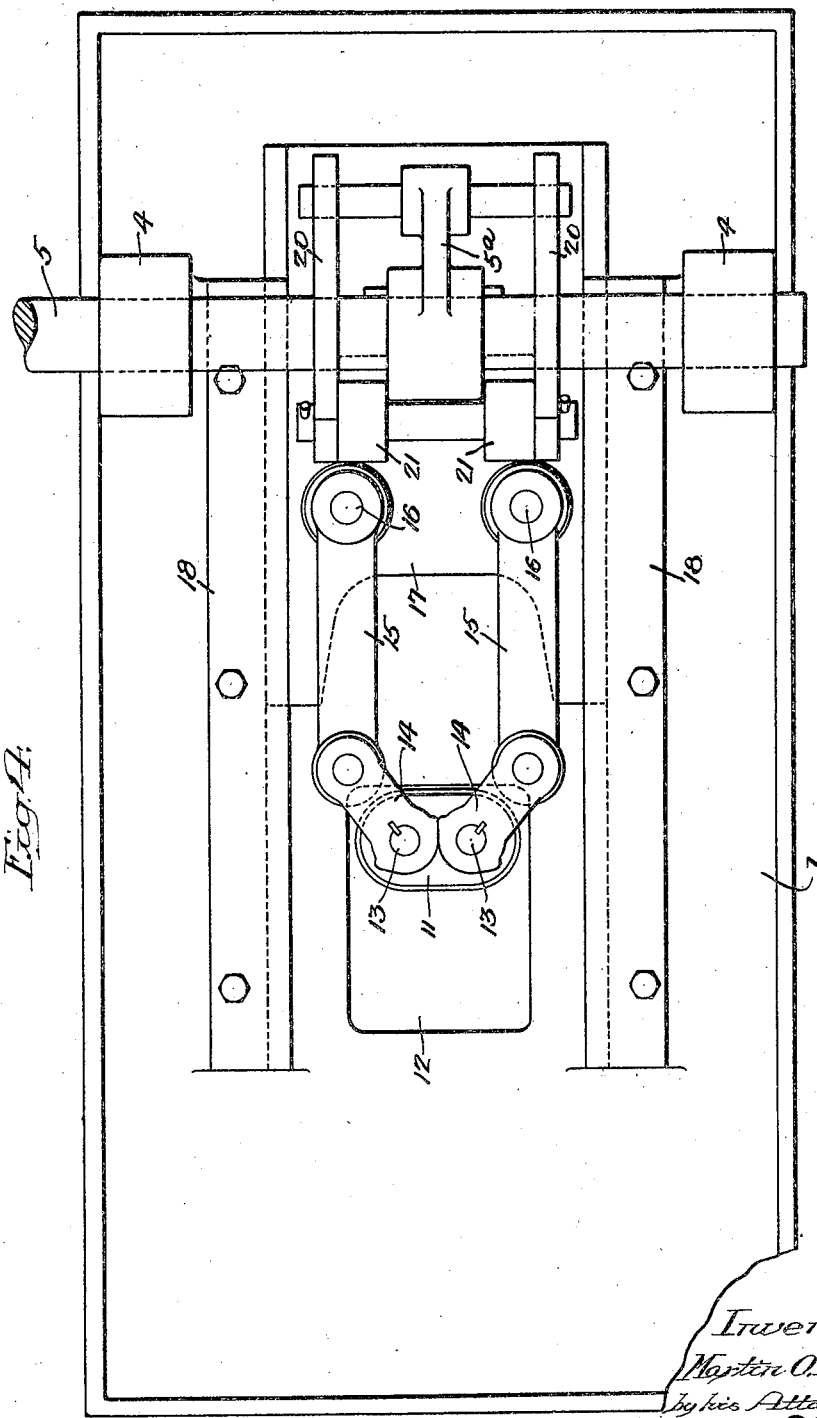

M. O. REHFUSS.
MACHINE FOR MAKING LINKS FOR CHAINS.
APPLICATION FILED MAR. 14, 1919.
1,360,020.
Patented Nov. 23, 1920.
5 SHEETS—SHEET 5.
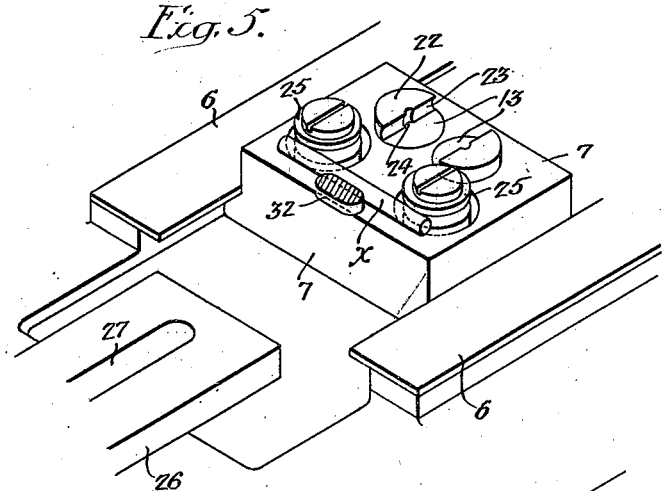
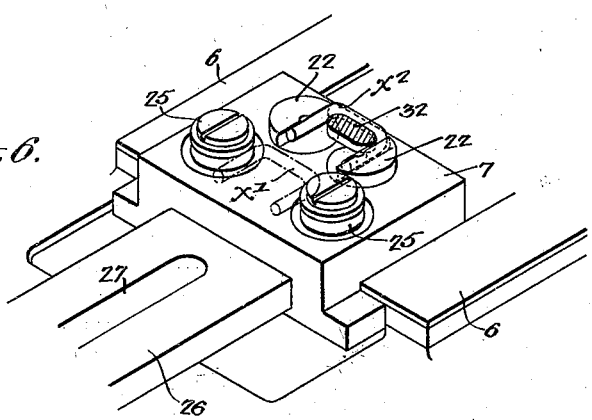
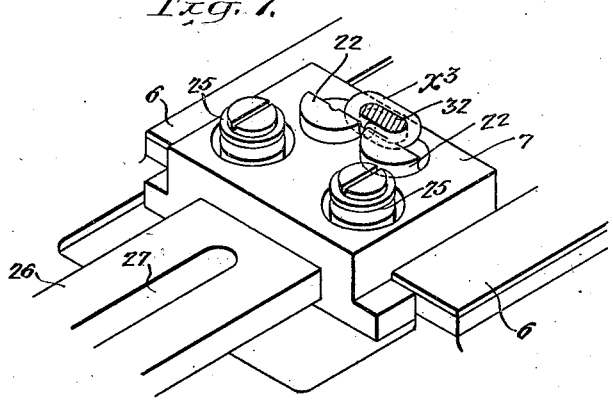
Inventor,
Martin O. Rehfuss,
by his Attorneys,
Howson & Howson

UNITED STATES PATENT OFFICE.

MARTIN O. REHFUSS, OF PHILADELPHIA, PENNSYLVANIA, ASSIGNOR TO UNITED STATES CHAIN AND FORGING COMPANY, OF PITTSBURGH, PENNSYLVANIA, A CORPORATION OF PENNSYLVANIA.

MACHINE FOR MAKING LINKS FOR CHAINS.

1,360,020.   Specification of Letters Patent.   Patented Nov. 23, 1920.

Application filed March 14, 1919. Serial No. 282,703.

*To all whom it may concern:*

Be it known that I, MARTIN O. REHFUSS, a citizen of the United States, residing in Philadelphia, Pennsylvania, have invented Machines for Making Links for Chains, of which the following is a specification.

One object of this invention is to provide a novel succession of steps for so acting upon a previously cut length of wire or rod material as to form therefrom a chain link whose abutting ends have their original circular section and flat terminal surfaces, and thereby permit of said surfaces being brought practically into full contact over their entire surface.

It is further desired to provide a relatively simple, substantial and commercially practical combination of parts for so operating upon a length of wire or rod as to form therefrom a closed chain link without flattening or otherwise deforming its abutting ends:—the invention contemplating bending rolls of novel form together with novel mechanism for causing them to operate in a definite manner upon a length of material to be formed into a link.

I also desire to provide a link forming machine which shall include two sets of members for bending a predetermined length of rod material, with mechanism for actuating these members in a novel manner with a view to so operating upon said material as to form a chain link whose abutting ends shall lie parallel and practically in contact with each other without being deformed by the operation of said members;— the invention contemplating the actuation of the link forming members with a view to causing them to act in a novel manner upon the material under treatment.

These objects and other advantageous ends I attain as hereinafter set forth, reference being had to the accompanying drawings, in which, Figure 1 is a side elevation partly in vertical section, showing the essential parts of a machine constructed in accordance with my invention whereby my method of forming chain links may be carried out;

Fig. 2 is a plan of the machine shown in Fig. 1;

Fig. 3 is a transverse vertical section on the line 3—3, Fig. 2;

Fig. 4 is an inverted plan of the machine; and

Figs. 5, 6 and 7 are fragmentary perspective views illustrating the succesive steps in the formation of a link in accordance with my invention.

In the above drawings 1 represents a base plate of substantial construction supported in any suitable manner and providing upwardly projecting bearings 2 for a shaft 3 extending transversely over said base. The latter also provides or supports a pair of downwardly projecting bearings 4 for a second shaft 5 parallel with the first and underneath the base. It is to be understood that these shafts are intermittently driven in timed relation to each other from any suitable source of power by mechanism whose detail construction constitutes no part of the present invention and is therefore omitted.

On the upper face of the base structure 1 and extending longitudinally thereof, I mount a pair of parallel guides designed for the reception of a slide 7 having at its rear end a pair of upwardly projecting standards or lugs 8 connected by a link 9 to an arm 10 fixed to the shaft 3 and the arrangement is such that an oscillation of this latter will cause the slide 7 to be reciprocated. The forward end of the slide has a downward extension 11 projecting through a suitably placed slot or opening 12 in the base structure and providing a bearing for two vertical spindles 13 each of which has an arm 14 fixed to its lower end. The free extremity of each of these arms has pivoted to it one end of a link 15 whose second end rotatably engages a post 16 projecting downwardly from the under side of a second slide 17 reciprocable in parallel guideways 18 mounted on the under side of the base 1.

For actuating this second slide 17 I fix to the lower shaft 5 an arm 5ª and through a pair of links 20 operatively connect said arm to a pair of lugs 21 on said slide. As a result of this arrangement of parts the oscillation of the shaft 5 causes a reciprocation of the slide 17 in its guides 18 and through the two pairs of links 14—15 causes a partial rotation in opposite directions of the two vertical spindles 13. The upper ends of these spindles have integral substantially semi-circular projecting portions 22 whose straight edge or chord portion 23 is concaved to conform to the curvature of the rod or wire material on which it is desired to operate. In addition the central portions of each of these sides or walls is recessed as indicated at 24 and the spindles are so mounted that under normal conditions, i. e.,—prior to the beginning of a cycle of operations, their concave straight edges face each other.

Journaled on the upper face of the slide 7 is a pair of bending rolls 25 whose peripheries are concaved or grooved to conform to the curvature of the rod $x$ to be operated on and they are positioned on said slide in advance of the spindles 13, being spaced at such a distance apart that their peripheral concavities are each tangent to the straight concave side 23 of the adjacent spindle 13 when said side is parallel with the longitudinal center line of the machine. An adjustable stop or abutment 26 is provided to limit forward movement of the slide 7, and this consists of a flat plate having an elongated slot 27 for the reception of a clamping bolt 28 whereby it may be retained in any given position on the base 1.

Also mounted on the base is a standard 29 having adjacent the central vertical longitudinal plane of the machine a guideway 30 for a vertically movable head 31 whose lower end normally rests upon the upper face of the top slide 7. Said end has a portion 32 constituting a king post having a transverse section of the form which it is desired shall be given to the hole or opening through the links to be formed. The head 31 is vertically movable in the guideway 30 by hand or any mechanical device forming no part of the invention and under operating conditions a rod or length of wire $x$ (Fig. 5) of circular section, having flat ends and of the predetermined length is placed immediately back of the king post 32 of the head 31 and in front of the two bending rolls 25; its position being such that it projects for equal distances on opposite sides of said king post.

The mechanism for operating the shafts 3 and 5 is so timed that when beginning operations these are turned to predetermined angles in opposite directions and at the same speed, thus causing both the slides 7 and 17 to be moved forwardly in their guideways at the same rate so that there is no such relative movement between them as would cause rotation of the spindles 13. The rollers 25 are thus caused to move past the king post 32 with the result that the two end portions of the rod $x$ are bent at right angles to its middle portion so that without alteration from their original straight forms the piece is give the U-shape indicated in dotted lines at $x^1$ in Fig. 6, it being particularly noted that the mounting of the two rolls is such that they engage the rod at some distance from its extremities and bend its ends without in any way crushing or deforming them, while at the same time causing the middle portion of said rod to assume the curvature of the king post 32. The continued rotation of the two shafts 3 and 5 and the consequent forward movement of the slides 7 and 17 then brings the projecting portions 22 of the spindles 13 into engagement with the side portions of the U-shaped rod which then occupies the relative position indicated at $x^2$ (Fig. 6). The stop 26 is so set as to prevent further forward movement of the slide 7 when this has reached the relative position indicated in Fig. 6 as is best determined by experiment and thereafter the lower shaft 5 continues its rotation while the shaft 3 remains stationary so that the lower slide 17 is moved forward, causing the two spindles 13 to be turned in opposite directions by reason of the resulting increased angularity of their associated links 14—15.

The adjacent portions of the links 14 as shown in Fig. 4 are circularly curved and designed to roll upon each other as the spindles 13 are thus turned and as a result of this movement, which is continued through substantially 90° from the position shown in Fig. 6 to that illustrated in Fig. 7, the parallel ends of the rod operated on are curved around the king post 32 by reason of their engagement with the concaved sides of the projections 22 so that their flat ends are brought parallel with each other and practically in contact. It is to be particularly noted that by reason of the formation of these ends of the spindles 13 this desired object is attained without crushing or other deformation of the rod, which is thus given the desired form of a chain link as determined by the shape of the king post 32.

While the shafts 3 and 5 remain idle the head 31 with the king post 32 is raised, and the formed link $x^3$ is removed, after which the two shafts 3 and 5 are turned in directions opposite those at first given them so that the slides are restored to their original positions shown in Figs. 2 and 4 and the spindles 13 are rotated to bring the concave sides 23 of their projections 22 from the alined position indicated in Fig. 7 to positions substantially parallel with each other. The head 31 is now lowered until the king post 32 engages the top face of the slide 7, after which another length $x$ of rod material is inserted by hand or otherwise between it and the rolls 25, when the machine may again be put in operation to form another link.

From the above description it will be noted that the parts of my machine are so arranged and timed that the primary bending of the rod under treatment occurs at two points each situated at a distance from its end equal approximately to one-quarter of its length. Such bending is accomplished without engagement of the primary bending rolls 25 with its extremities. The secondary bending rolls then begin their operation on the partially bent rod at the points where the primary rolls ceased and thereafter continuously bend the end portions of the rod without actually engaging its extremities, until these are in contact. It is by this succession of operations that the parallelism of the abutting ends of the finished link is maintained and the crushing, flattening or other deformation of the link is prevented.

I claim:

1. The combination in a link forming machine of a post; two sets of rod bending members; means for moving one set of said members past the post to give a U-shape to a straight rod engaged thereby; and means for thereafter axially rotating the second set of members to cause their heads to bend the ends of the rod toward each other.

2. The combination in a link forming machine of a forming post; a slide; two rollers mounted on the slide in positions to coact with the post to bend a length of rod material into U-shaped form; a pair of axially rotatable, headed elements; and means for causing the heads of said elements to act upon the length of material after it has been given the U-shaped form to bend its ends toward each other.

3. The combination in a link forming machine of a post; a slide; two sets of rod bending members mounted on the slide to successively operate on a length of rod material held by the post; means for moving the slide toward and from the post; and means for axially rotating the members of one of said sets to bend a portion of the rod around the post.

4. The combination in a link forming machine of a post; a reciprocable slide; two rolls mounted on the slide in positions to pass on opposite sides of the post when the slide is moved in one direction, to give a rod engaged by the post a substantially U-shaped form; with a set of rotary elements also carried by the slide having substantially straight walls for engagement with the end portions of the material bent by said rolls; and means for turning said elements to cause the ends of said material to be bent around the post toward each other.

5. The combination in a link forming machine of a forming post; a slide; two rolls carried by the slide and movable on opposite sides of the post to bend a rod into a U-shaped form; a pair of oscillatory spindles also carried by the slide having straight walls positioned for engagement with the end portions of the U-shaped structure formed by the rolls; and means for turning said spindles to bend said end portions of said structure around the post.

6. The combination in a link forming machine of a supporting structure having two guideways; slides movable in the guideways; means for reciprocating the slides; a forming post; a pair of rolls carried by one of the slides in positions to pass on opposite sides of said post; a pair of oscillatory spindles also carried by said latter slide and having portions for engagement with a length of rod material after it has been partially bent around the post by said rolls; and means for connecting said spindles with the second slide for causing their oscillation after they have been brought into coöperative positions relatively to the partially formed length of material.

7. The combination in a link forming machine of a supporting structure having guideways; two slides operative in said guideways; means for reciprocating the slides; a head including a forming post; two rolls mounted on one of the slides in positions to coöperate with the post to give a length of material a substantially U-shaped form; and two oscillatory spindles journaled in said slide and including portions having substantially straight walls positioned to engage the unaltered straight portions of the length of material after it has been acted on by said rolls; arms for said spindles; and links for connecting said arms to the second slide.

In witness whereof I affix my signature.

MARTIN O. REHFUSS.